Jan. 9, 1968   J. MONDOT ET AL   3,363,117
ULTRASONIC TRANSDUCER ARRANGEMENT
Filed Dec. 31, 1964   2 Sheets-Sheet 1
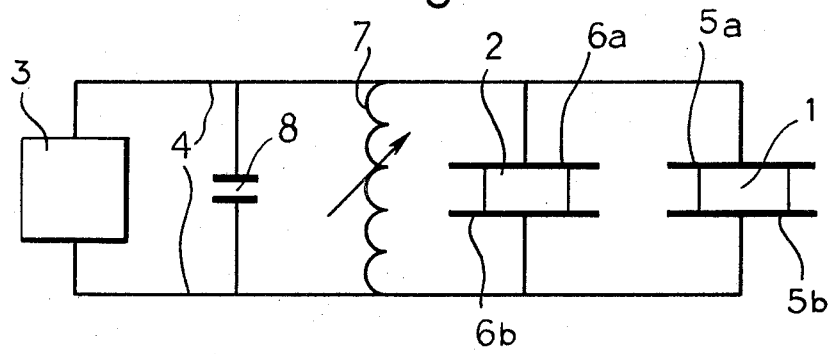
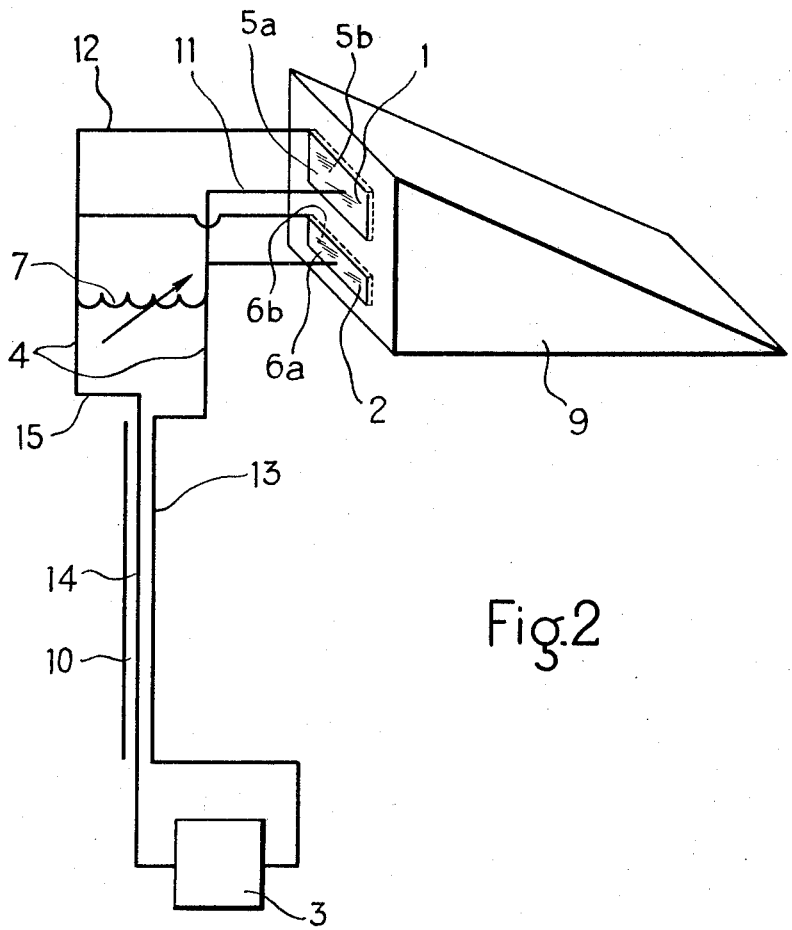

United States Patent Office 3,363,117
Patented Jan. 9, 1968

3,363,117
ULTRASONIC TRANSDUCER ARRANGEMENT
Jacques Mondot and Marian Kapluszak, Saint-Germain-en-Laye, France, assignors to Institut de Recherches de la Siderurgie Francaise, Saint-Germain-en-Laye, France, a professional institution
Filed Dec. 31, 1964, Ser. No. 422,651
Claims priority, application France, Jan. 3, 1964, 959,216, Patent 1,390,283
3 Claims. (Cl. 310—8.1)

ABSTRACT OF THE DISCLOSURE

An ultrasonic angle beam testing device in which two piezoelectric transducers having different resonant frequencies are attached to a common plastic wedge and are connected to a source of electric pulses in parallel circuit with each other and with a resonant electrical circuit whose resonant frequency is intermediate the frequencies of the transducers so that the frequency response of the device between the two resonant frequencies of the transducers is flatter than it would be in the absence of the resonant circuit.

---

This invention relates to ultrasonic transducer arrangements, and particularly to a transducer arrangement for use in the inspection of solid bodies.

The electromechanical energy emitted by an ultrasonic transducer is capable of propagation in the body to be tested in several wave types. Certain wave types, such as the Lamb waves, are propagated in the tested body only at a predetermined angle of incidence due to a specific relative position of the transducer and the surface of the tested body, and in a narrowly limited range of frequencies which is a function of the thickness of the tested body. In view of these characteristics, the ultrasonic waves emitted by a transducer operated at a fixed frequency and directed at the tested body at a fixed angle of incidence are not propagated in the tested body unless it has a unique and practically constant thickness.

These limitations make it difficult or impossible to use such transducers for the ultrasonic testing of moving hot-rolled steel mill products whose thickness varies considerably. A conventional ultrasonic transducer would have to be adjusted to the instantaneous thickness of the tested material by varying either the angle of incidence or the frequency of the emitted ultrasonic waves. Because of the pronounced mechanical resonance of electromechanical transducers, a single transducer can be employed economically only over a frequency range which is much too narrow to permit frequency adjustment. It would, therefore, be necessary to use several transducers having different resonant frequencies, each adapted to cover a certain thickness range, or to device transducers mounted for variable incidence angle. Both approaches to a solution of this problem call for complex equipment and/or complicated operation, particularly if rapidly moving continuous steel shapes and like products are to be tested. The switching between several transducers would require calibration of the testing apparatus for each transducer.

An object of the invention is the provision of a simple electromechanical transducer arrangement which emits ultra-sound of adequate amplitude over a wide band of frequencies.

With this object and others in view, as will hereinafter become apparent, the invention provides a transducer arrangement for the emission and reception of ultrasonic energy which includes at least two juxtaposed electromechanical transducers having different respective resonant frequencies, at least one resonant circuit having an adjustable resonant frequency between the frequencies of the transducers, and a common source of electrical energy in circuit with the transducers and the resonant system.

We have found that such a transducer arrangement permits ultrasonic energy of adequate amplitude to be emitted over a band of frequencies wide enough to minimize or eliminate the variations in angle of incidence of ultrasonic waves and product thickness, which cannot be avoided in the continuous inspection of rapidly moving material delivered from a rolling mill. Even if the thickness of the rolled product varies, the spectrum of frequencies emitted by the transducer arrangement is wide enough to include waves of a frequency capable of being propagated in the material to be tested if the transducer arrangement is excited by a pulse generator, as is usual.

In a preferred embodiment of the invention, two piezoelectric units having different resonant frequencies are arranged in parallel circuit with a resonant system of adjustable resonant frequency consisting of an inductor and a capacitor, which enhances frequencies near its own resonant frequency. The resonant system thus may be tuned to enhance frequencies between the resonant frequencies of the piezo-electric units for obtaining a wide range of frequencies at useful amplitudes.

The use of an adjustable resonant system has an additional advantage. The amount of ultrasonic energy absorbed by a body varies with the frequency and with the thickness of the body. Adjustment of the resonant frequency of the system makes it possible to compensate to a certain extent for the absorption characteristics of the tested material and to enhance the frequencies which are most readily absorbed. The apparatus, therefore, has an almost uniform sensitivity for detecting defects for a range of thicknesses which, in a conventional transducer arrangement, would require at least three transducers and separate calibration of each.

Other features and many of the attendant advantages of this invention will be readily appreciated as the same becomes better understood from the following detailed description of a preferred embodiment, when considered with the accompanying drawing in which:

FIG. 1 is a diagram of a piezo-electric transducer arrangement of the invention, including two piezo-electric crystals and a resonant circuit;

FIG. 2 is a partly perspective, partly diagrammatic view of the apparatus of FIG. 1;

Figure 3:
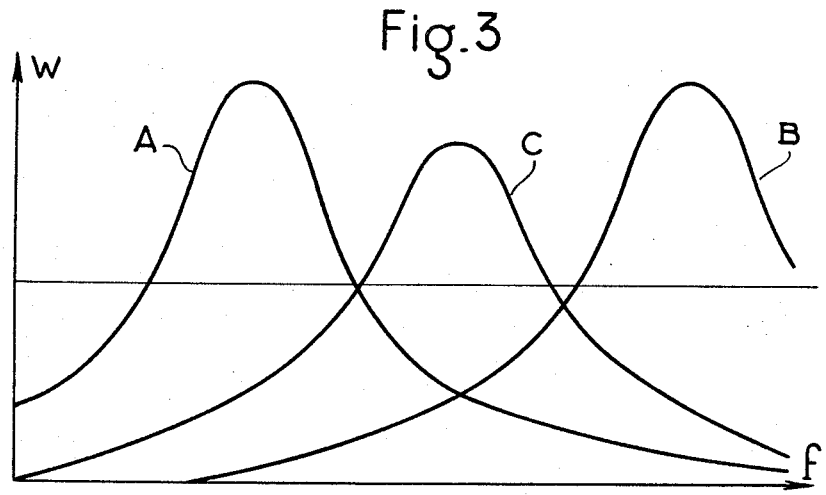
FIG. 3 shows the resonance curves of the two piezo-electric crystals and of the resonant circuit of the apparatus of FIG. 2 in a common system of coordinates.

Referring initially to FIG. 1, there are shown two piezo-electric crystals 1, 2 which are supplied with electrical energy in parallel circuit by an electrical pulse generator and receiver 3 of conventional design. The leads 4 connected to the generator and receiver terminals are soldered to electrodes 5a, 5b, 6a, 6b on the piezo-electric crystals, the electrodes being produced by metallizing suitable faces of crystals. A coil 7 of variable inductance and a capacitor 8 are shown to be arranged in parallel circuit between the leads 4 but it will be understood that the capacitor 8 merely represents the capacitance of the piezo-electric crystals and the unavoidable capacitance of the assembly.

When the generator and receiver 3 supplies electrical pulses, the crystals 1 and 2 vibrate, each at its own resonant frequency. The inductance of the coil 7 can be adjusted in such a manner that it forms a circuit with the capacitor 8, the resonant frequency of the circuit being between those of the crystals 1, 2 so as to enhance intermediate frequencies.

FIG. 2 shows the apparatus of FIG. 1 partly in a perspective view, and partly in a conventional manner. The searching unit of the illustrated device includes the two piezo-electric crystals 1, 2, which are connected with the generator and receiver 3 by the leads 4. The crystals 1, 2 are adhesively secured to a face of a polymethyl methacrylate wedge 9 which transmits the vibrations of the crystals to the object to be tested at the desired angle of incidence.

The leads 4 of the searching unit are connected by a coaxial cable 10 with the pulse generator and receiver 3. The capacitance illustrated by the capacitor 8 in FIG. 1 is distributed over several elements of the apparatus shown in FIG. 2. It is mainly provided by the crystals 1 and 2, and by the coaxial cable 10.

The metallized faces or electrodes 5a and 6a on the two crystals are connected by a conductor 11, and the electrodes 5b and 6b are similarly connected by a conductor 12. The terminals of the coil 7 are respectively connected to the conductors 11, 12. The coil has an approximate inductance of 3 microhenrys. It consists of approximately 20 turns of wire, the wire having a diameter of 0.25 mm. and being tightly wound into turns of 6 mm. diameter. The coil is only supported on its terminals, one of which may be shifted for tuning. The coaxial cable 10 has an outer shield 15 and a central conductor 14.

The apparatus will further be understood to include an amplifier circuit coupled to the searching unit and a cathode ray tube for indicating the presence of a defect in the tested product. Since the manner of providing visible indicia of a defect is not in itself at the core of this invention, and may be entirely conventional, the receiving arrangement associated with the searching unit has not been illustrated and will not be described in more detail.

FIG. 3 shows the individual resonance curves A of the crystal 1, B of the crystal 2 and C of the resonant circuit of the coil 7 and the capacitor 8 in a common system of coordinates, the amplitude $w$ being represented in arbitrary units as a function of the frequency $f$ in megacycles per second.

Figure 4:
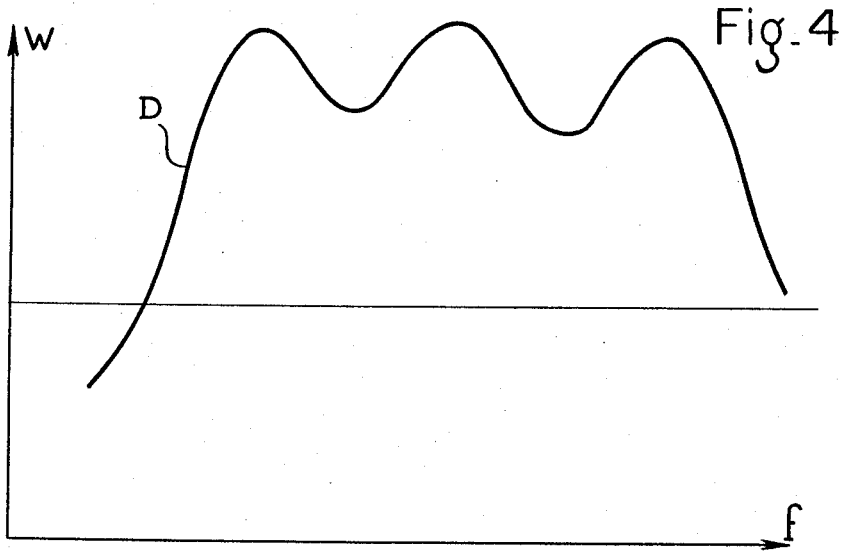
FIG. 4 illustrates the amplitude of the ultrasonic radiation emitted by the device of FIG. 2 at various frequencies.

FIG. 4 shows the response curve D of the transducer arrangement illustrated in FIGS. 1 and 2. The bandwidth of useful amplitudes is substantially greater than the combined width of the two crystals considered individually. If the resonant frequencies of the crystals 1 and 2 represented by the peaks of the curves A and B in FIG. 3 are 1.1 and 1.6 mcs. respectively, there is obtained a range of useful frequencies which extend uninterruptedly from 0.9 to 1.8 mcs. approximately, permitting inspection of steel products whose thickness varies between 1.5 mm. and 4.7 mm. by Lamb waves.

Contrary to conventional devices for ultrasonic inspection by the reflection method, the electromechanical transducer arrangement of the invention is substantially aperiodic over a band of useful frequencies, and the proper frequency is imposed upon the system by the object which is to be tested.

Figure 5:
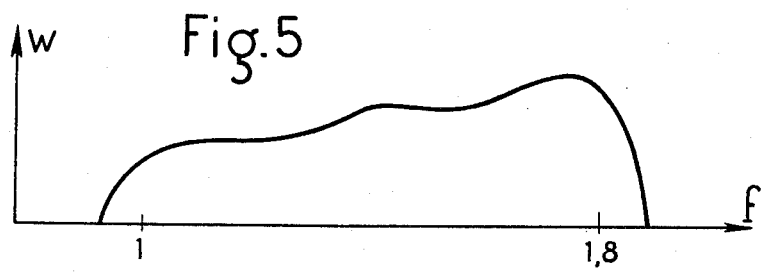
FIG. 5 shows the frequency distribution of the ultrasonic energy emitted from a modified device of the invention.

If the detection sensitivity of the testing apparatus is to be held substantially constant over the range of frequencies employed, it is possible to enhance certain frequencies which are less well transmitted, or which are more strongly absorbed by the tested product. FIG. 5 shows the response curve of a transducer arrangement of the invention designed to favor higher frequencies. The apparatus whose characteristics is shown in FIG. 5 differs from that illustrated in FIG. 2 by a piezo-electric crystal of higher resonant frequency which has a larger electrode surface than the other crystal so as to increase its share of emitted energy. The response curve is adjusted by varying the resonant frequency of the circuit 7, 8 until the desired response curve is obtained. It will be appreciated that such a mode of operation is impossible with a conventional transducer system.

The transducer arrangement of the invention increases the field of application of an ultrasonic testing unit by making it suitable for products varying in thickness over a relatively wide range. The arrangement of the invention also permits compensation for differences in the absorption characteristics of the tested product according to thickness by making it possible to enhance radiation of frequencies which are most actively absorbed by the product.

The sensitivity of the testing apparatus for detecting flaws in the product can thus be held substantially uniform over a range of thicknesses which would require at least three different transducers, and calibration for each of them in a conventional arrangement.

While reference has been made hereinabove to the testing of flaws in metal objects, more particularly steel objects, it will be appreciated that the transducer arrangement of the invention is not limited to specific tested material but is applicable to the detection of discontinuity in any material permeable to ultrasonic waves. It will also be understood that not only internal flaws, but also surface defects may be detected by the transducer arrangement of the invention in a manner known in itself.

Obviously, many other modifications and variations of the present invention are possible in the light of the above teaching. It is therefore to be understood that within the scope of the appended claims, the invention may be practiced otherwise than as specifically described.

What we claim is:

1. In a wide frequency band search unit for an ultrasonic testing device comprising, in combination:
   (a) two electro-mechanical transducers closely juxtaposed to each other on a common transmitting wedge and having different resonant frequencies;
   (b) an adjustable resonant system comprising an inductance and a capacitance having means for varying the resonant frequency of said system in the range between the resonant frequencies of said transducers;
   (c) a source of electrical pulses; and
   (d) conductive means for connecting said transducers and said system to said source of electrical pulses whereby wide frequency band ultrasonic waves are transmitted into the transmitting wedge and a frequency determined by the thickness of the article under test is reflected back into the transmitting wedge.

2. A unit as set forth in claim 1, wherein said conductive means connect said transducers in parallel circuit.

3. A unit as set forth in claim 2, wherein said conductive means connect said system to said transducers in parallel circuit.

References Cited
UNITED STATES PATENTS

| | | | |
|---|---|---|---|
| 2,628,335 | 2/1953 | Drake | 310—8.1 |
| 2,667,780 | 2/1954 | Valkenburg | 310—8.1 |
| 2,842,959 | 7/1958 | Henry | 310—8.1 |
| 3,075,097 | 1/1963 | Scarpa | 310—8.1 |
| 3,276,249 | 10/1966 | King | 73—67.8 |
| 3,279,242 | 10/1966 | Megoloff | 73—67.8 |

MILTON O. HIRSHFIELD, *Primary Examiner.*

J. D. MILLER, *Assistant Examiner.*